(12) United States Patent
Meyer et al.

(10) Patent No.: US 6,713,929 B2
(45) Date of Patent: Mar. 30, 2004

(54) SERIES-WOUND MOTOR

(75) Inventors: Christoph Meyer, Stuttgart (DE); Alfred Schreiber, Kirchheim (DE)

(73) Assignee: C. & E. Fein GmbH & Co. KG (DE)

( * ) Notice: Subject to any disclaimer, the term of this patent is extended or adjusted under 35 U.S.C. 154(b) by 37 days.

(21) Appl. No.: 10/155,479

(22) Filed: May 24, 2002

(65) Prior Publication Data

US 2002/0171317 A1 Nov. 21, 2002

Related U.S. Application Data

(63) Continuation-in-part of application No. 09/790,115, filed on Feb. 21, 2001, now abandoned.

(30) Foreign Application Priority Data

Feb. 25, 2000 (EP) .............................................. 00103957
Jul. 5, 2000 (DE) ......................................... 100 32 039

(51) Int. Cl.⁷ .............................. H02K 1/12; H02P 3/06
(52) U.S. Cl. ...................... 310/216; 310/186; 310/214; 310/256
(58) Field of Search ................................ 310/214, 256, 310/269, 218, 216, 190, 186

(56) References Cited

U.S. PATENT DOCUMENTS

| | | | | |
|---|---|---|---|---|
| 676,439 A | * | 6/1901 | Merrick | 310/218 |
| 911,713 A | * | 2/1909 | Frankenfield | 310/265 |
| 2,818,542 A | | 12/1957 | Linsley et al. | 318/377 |
| 3,469,136 A | * | 9/1969 | Jenkinson | 310/216 |
| 3,643,118 A | | 2/1972 | Ichiki et al. | 310/40 |
| 3,891,881 A | * | 6/1975 | Harris et al. | 310/218 |
| 4,144,482 A | | 3/1979 | Schwab | 318/381 |
| 4,147,946 A | * | 4/1979 | Linscott et al. | 310/214 |
| 4,439,703 A | * | 3/1984 | Kohzai et al. | 310/186 |
| 4,774,443 A | * | 9/1988 | Herzig | 318/293 |
| 5,493,162 A | * | 2/1996 | Wuerth et al. | 310/218 |
| 5,677,586 A | * | 10/1997 | Horst | 310/103 |
| 6,353,297 B1 | | 3/2002 | Meyer | 318/273 |

FOREIGN PATENT DOCUMENTS

| | | |
|---|---|---|
| CH | 102614 | 8/1922 |
| DE | 4333733 | 10/1933 |
| DE | 68278 | 6/1968 |
| DE | 4201023 | 1/1992 |
| DE | 4307357 | 3/1993 |
| DE | 195 07 264 | 3/1995 |
| DE | 4201005 | 8/1995 |
| DE | 19636519 | 9/1996 |
| EP | 1 014543 | 12/1998 |
| JP | 59280956 | 7/1986 |
| WO | WO 91/03866 | 3/1991 |
| WO | WO 97/36367 | 10/1997 |
| WO | WO 88/03337 | 5/1998 |

* cited by examiner

Primary Examiner—Burton Mullins
(74) Attorney, Agent, or Firm—St. Onge Steward Johnston & Reens LLC (57) ABSTRACT

A series-wound motor is disclosed which is particularly suitable as a universal motor for an electric power tool. The motor comprises a stator with at least two field poles, each having two pole horns. At least one of the pole horns of each pole comprises first and second protrusions extending circumferentially from an axial edge of the pole horn. Sparking is reduced thereby. Also a retarded motor is disclosed, wherein each pole comprises a pole horn having a run-on edge, and further comprises a pole horn having a run-off edge. The pole horns having run-off edges are shortened in circumferential direction compared to the pole horns having run-on edges or comprise at least one cutout section extending in circumferential direction. The motor can be switched between a motor operation and a brake operation, without the need for providing commutating windings or additional coils to avoid excessive sparking.

33 Claims, 5 Drawing Sheets

SERIES-WOUND MOTOR

RELATED APPLICATIONS

This is a continuation-in-part application of U.S. patent application Ser. No. 09/790,115 filed Feb. 21, 2001, now abandoned which claims convention priority of German patent application 100 32 039.2 and European patent application 00 103 957.7.

BACKGROUND OF THE INVENTION

The invention relates to a series-wound motor, in particular a universal motor for an electric tool, having an armature with a commutating coil, which is rotatably mounted in a stator that forms a closed yoke and which is supplied with power by brushes. The stator comprises at least two field poles, each having a center section being integral with the closed yoke. From each center section two pole horns extend circumferentially defining axial grooves extending between the closed yoke and the pole horns.

Series-wound motors may be operated, selectively, with a first direction of rotation or with a second direction of rotation and may also comprise a switch for reversing the direction of rotation.

Alternatively, series-wound motors may have a preferred direction of rotation. In this case each pole comprises a pole horn with a run-on edge and a pole horn with a run-off edge. Also such series-wound motors having a preferred direction of rotation may have a braking system for active, self-exerted braking or for braking initiated in a different way.

In the retarded series-wound motors usually at least one field coil and a switching means are provided for switching between motor operation and brake operation. In motor operation, the field coil is connected in series with the armature coil in a motor circuit supplied with a source voltage. In brake operation, the field coil forms a closed braking circuit with the armature coil, separated from the voltage source.

A series-wound motor of this type is disclosed in German patent DE 196 36 519. The known motor is a universal motor with a pole package having a field pole arrangement of two pole portions each, where the pole package is designed for a predetermined rotary direction. The motor has a switching arrangement between motor and brake operation and includes a current path parallel to the field coil containing a diode array. To achieve good commutation both in motor operation and in brake operation, an additional field coil is provided which surrounds the field coil at the run-off edge of the two pole horns with a special configuration of the pole plates and is separately located at the run-on edges of the pole horns.

To ensure a sufficient commutation in motor operation, the commutation of the armature coil in universal motors is normally displaced with respect to the geometric neutral zone counter to the running direction. This normally is achieved in that the carbon brushes are shifted counter to the rotational direction of the armature out of the neutral zone. In this manner, reduced sparking is achieved, without commutator windings being necessary. If such a universal motor is to be retarded or braked by reversing the poles of the armature coil or the field coil with a switching device and by short circuiting the motor, then a deficient commutation results during the braking phase of the motor, if the brushes are not adjusted or no commutating poles are provided.

This problem is avoided in the above-mentioned motor through the use of additional coils in conjunction with the special winding arrangement, however in comparison to conventional universal motors which only require two field coils (a subdivided field coil) and a displacement of the brushes out of the geometric neutral zone counter to the running direction of the motor, the construction of the above motor is considerably more complicated. Furthermore, a much greater weight results for the same motor performance or, for the same weight, a reduced performance.

The use of commutating windings or additional coils to avoid the mentioned commutation problems is considered to be a drawback because such motors are used particularly for electric tools, in which a high performance with the smallest possible weight is important and in which large volumes of motors are to be produced at the most inexpensive cost.

Also series-wound motors not having a preferred direction of rotation always may have particular problems with sparking which requires a regular service for replacing the brushes after certain operating times. Consequently, there exists a continuous need for a series-wound motor having reduced sparking.

SUMMARY OF THE INVENTION

It is a first object of the present invention to provide an improved series-wound motor, which guarantees a sufficiently good commutation and in which excessive sparking is avoided.

It is a second object of the present invention to disclose an improved series-wound motor, having increased power without increasing outer dimensions.

It is a third object of the invention to disclose an improved series-wound retarded motor, which guarantees a sufficiently good commutation and in which excessive sparking in particular during a braking operation is avoided.

It is a further object of the invention to provide an improved series wound motor which allows active braking without the need for supplementary windings.

It is a further object of the invention to provide an improved series wound motor that allows self-excited braking and is very reliable.

These and other objects of the present invention are achieved in a series-wound motor of the above-mentioned type by providing at least one pole horn with first and second protrusions protruding circumferentially from an axial edge of the pole horn. In a different embodiment each pole horn may be provided with first and second protrusions protruding circumferentially from an axial edge of the pole horn.

The object of the invention may be achieved in a retarded series-wound motor by making the pole horns at the run-off side shorter than the pole horns at the run-on side.

Alternatively, at least on the run-off side the poles comprise at least two protrusions extending in circumferential direction. The protrusions that may, preferably, be located at the axial ends of the stator, define a cutout section therebetween. Also on the run-on side such protrusions may be provided.

The inventor has found that by providing such protrusions the neutral zone is extended. The invention provides for more room for attaching a field coil to the field pole. This is important, in particular, with respect to the utilization of preformed coils (coils that have been wound externally and that are usually stabilized by wrapping with tape). The preformed coils are then attached to the field poles by inserting them into the axial grooves formed between the closed yoke and the pole horns extending therefrom. The protrusions facilitate broader field coils, since the winding package is held by the protrusions extending from the axial edge of the respective pole horn.

This leads to a dramatic decrease in sparking. It was found that service life of the brushes was increased almost three-fold when compared with conventional arrangements. Also power of the motor may be increased without increasing outer dimensions of the motor.

The reduction in sparking is considerably important for motors that allow switching between two directions of rotation, as well as for motors having a preferred direction of rotation and a braking system.

While unbraked series-wound motors with a preferred direction of rotation may have a pole overlap of roughly 120 to 125 degrees, smaller pole overlaps of roughly 105° to 110° are made possible by the invention for motors that have two directions of rotation as well as for retarded motors.

Also it has been found in retarded motors with braking systems that no negative influence occurs during the normal motor operation mode due to the shortening of the pole horns at the run-off edge, or due to the arrangement of recesses at the run-off edge of the pole horns, while at the same time an increased commutating sparking is avoided in brake operation. The commutating armature coil can be displaced counter to the running direction from the geometric neutral zone, for which purpose the brushes are preferably arranged to be rotated counter to the rotary direction of the armature out of the neutral zone. Basically, however, it is also possible to configure the circuit switching connections so that a brush displacement is reached.

Commutating windings or other additional coils can be relinquished with such an arrangement of the field poles at the run-off edges of the pole horns, because a distinctly improved commutation is achieved in this manner also in brake operation. In brake operation, an enhanced concentration of the magnetic field lines arises at the run-off side of the pole horn, while in motor operation this takes place at the run-on sides of the pole horns. The increased brush sparking in motor operation mode caused by unfavorable arrangement of the brushes is counteracted by the shortening of the pole horns on the runoff side or by the use of recesses or cutouts.

At the same time, a distinctly improved self-excitation results for self-exciting retardation, so that a reliable braking of the motor occurs when switching to the braking mode.

In a preferred embodiment of the present invention, at least two protrusions or tongues are provided extending in circumferential direction on the respective run-on edges of the pole horns, between which the at least one recess is formed. In this manner, an impairment of the motor behavior in the motor operation phase can be practically completely avoided, while at the same time, the desired improvements in the braking phase are achieved. In addition, a good placement of the field coil winding is achieved on the run-off edge of the pole horn.

As mentioned, the armature coil is preferably displaced with respect to the geometric neutral zone contrary to the preferred rotary direction.

In addition, means are preferably provided to limit the brake current flowing in brake operation. Two anti-parallel diode arrays can be employed in known manner, which are switched to be parallel to the field coil in brake operation.

According to another embodiment of the invention, a transformer is provided connected to the power grid, whose secondary winding is connected parallel to the field coil in the brake circuit, where a control switch, preferably a transistor is provided to control the current flowing in the brake circuit across the armature coil and the field coil. Preferably, the control switch is a field effect transistor, which is connected with its source and drain to be parallel with the field coil and which controls the current through the field coil depending on the current flowing in the armature coil.

With this configuration, a current is introduced into the brake circuit through the secondary winding of the transformer, which ensures a reliable initiation of braking in all circumstances. In this manner, a reliable initiation of the braking by switching to the braking mode is ensured even in the most unfavorable situations. Through the field effect transistor, it is possible to regulate the brake current even in the advanced stage of the braking process such that a strong braking moment is present. The braking characteristic is greatly improved to ensure a short braking time. The braking characteristic can be adapted such that a slow running out of the motor at the end of braking can be avoided. For this purpose, the field effect transistor is preferably connected with its gate through a voltage divider to the brushes and thus also to the armature coil.

Preferably, a load resistor is provided in the brake circuit, which is connected through a diode to one brush and one end of the field coil via a diode. One end of the load resistor is connected to the drain of the field effect transistor. The source of the field effect transistor is connected to the other brush and the other end of the field coil.

According to another preferred embodiment of the invention the secondary winding of the transformer is coupled via a rectifier circuit, preferably via a bridge rectifier in parallel to the field winding, wherein the positive output of the bridge rectifier is coupled to drain and the negative output is coupled to source of the field effect transistor.

It will be understood that the above-mentioned features and those to be discussed below are applicable not only in the given combinations but may be used in other combinations or taken alone without departing from the scope of the invention.

SHORT DESCRIPTION OF THE DRAWINGS

Further features and advantages of the present invention can be taken from the following description of a preferred embodiment. In the drawings.

DETAILED DESCRIPTION OF THE PREFERRED EMBODIMENTS

Figure 1:
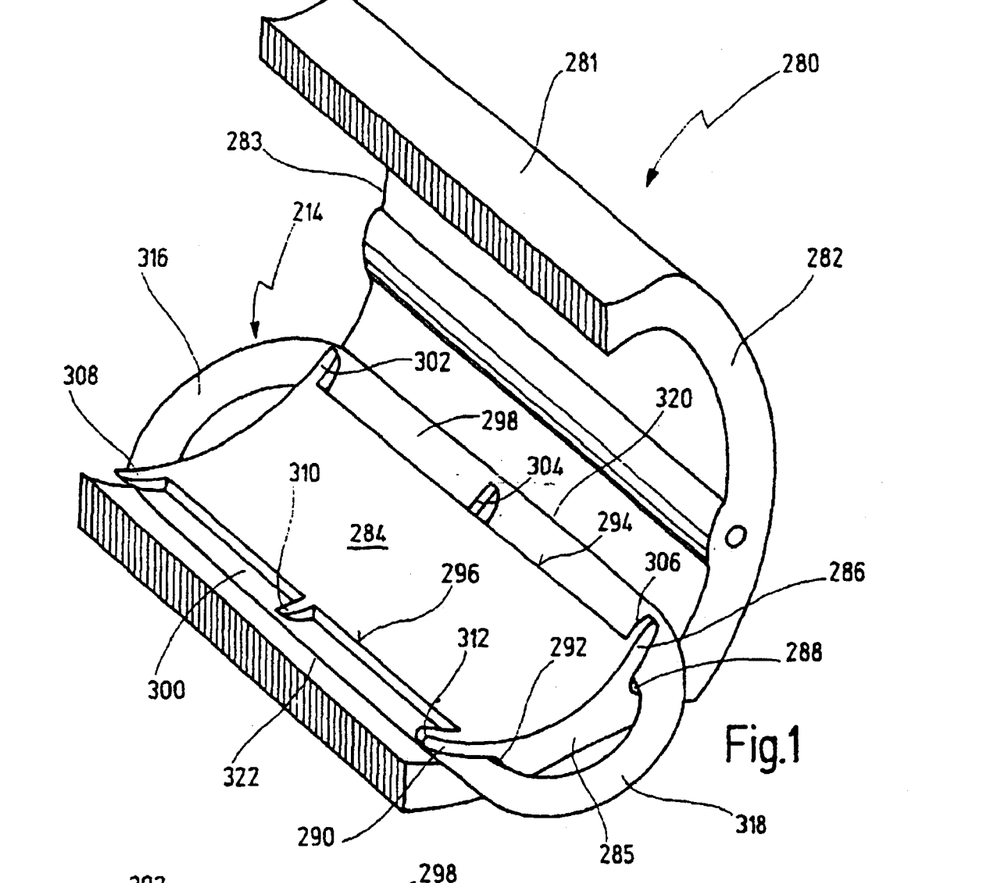
FIG. 1 shows a perspective view of a stator according to the invention, axially cut apart for ease of explanation.

In FIG. 1, a stator for a series-wound motor is shown and denoted in general with reference numeral 280.

For ease of explanation, the stator 280 is shown cut in two halves or may even be comprised of two halves that are fitted together as will be explained later on with reference to FIG. 5.

The stator 280 is configured as a closed yoke 281 and comprises two field poles around which field coils are fitted. In FIG. 1, only one field pole 284 and the respective field coil 214 are shown. The field pole 284 comprises a central section 285 which is part of the closed yoke 281. From the central section 285, two pole horns 286, 290 extend in roughly circumferential direction defining axial grooves 288 and 292, respectively, between the pole horns 286, 290 and the closed yoke 281.

The field coil 214 is configured as a preformed winding that is wound externally and then formed to a winding package by wrapping a suitable tape around, thereby forming a winding package that is totally surrounded at its outer side by a thin tape. The field coil 214 comprises two axial ends 316, 318 and two lateral sections 320, 322 extending therebetween. The field coil 214 is attached to the stator 280 by inserting the lateral sections 320, 322 into the axial grooves 288, 292. Usually, as known in the art, the lateral sections 320, 322 are inserted into the grooves 288, 292 together with a layer of suitable insulation paper (not shown in the drawing). The axial ends 316, 318 will then protrude beyond the axial ends 282, 283 of the stator 280.

According to a unique feature of the invention, at each edge 294, 296 in which the respective pole horn 286, 290 ends circumferentially, three protrusions 302, 304, 306 and 308, 310, 312, respectively, are provided. These protrusions 302, 304, 306, 308, 310, 312 are configured like tongues extending from the respective edges 294, 296 in roughly circumferential direction. Each pole horn 286, 290 comprises two protrusions 302, 306 and 308, 312, respectively, that are arranged at the axial ends 283, 282 of the stator 280, respectively, as well as a central protrusion 304 and 310, respectively, arranged in the center therebetween. Between the protrusions 302, 306 and 308, 312, respectively, cutout sections, generally denoted with reference numerals 298 and 300, are formed.

As can be easily seen from FIG. 1, the protrusions 302 to 312 that protrude from the respective edges 294 and 296, respectively, act to keep the field coil 214 in place within the axial grooves 288 and 292, respectively, while allowing a rather large volume for the winding package to be housed in the space between the pole horns 286 and 290, respectively, without protruding inwardly into the space that needs to be kept free for the armature or rotor.

As can be seen from FIG. 1, the stator 280 is comprised from a plurality of magnetic sheets that are attached to each other forming the magnetically closed yoke 281. Since the sheets may be easily manufactured by punching, the respective cutout sections can easily be provided without any additional costs. Thus, the protrusions 302 to 312 may be formed by one or more layers of sheets used in the manufacture of the stator 280.

Figure 2:
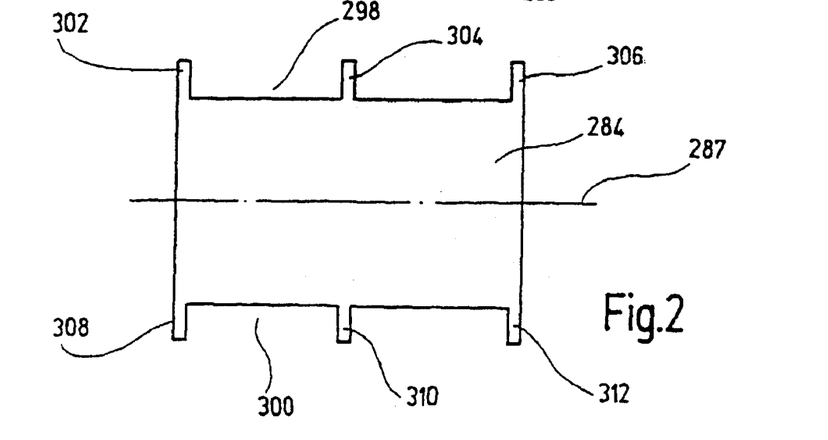
FIG. 2 shows a projection of the field pole shown in FIG. 1 onto a flat plane, seen from the inside.

In the design according to FIG. 1, each field pole is configured symmetrically as can be seen from FIG. 2 showing a center line 287 from which the pole horns extend into opposite directions.

The stator 280 may be utilized in a series-wound motor (universal motor) having a preferred direction of rotation or having two possible directions of rotation that may be reversed by a suitable switching means. Also, when configured as a motor with preferred direction of rotation, a braking system may be applied as will be explained in the following with reference to FIGS. 4 through 8.

Figure 3:
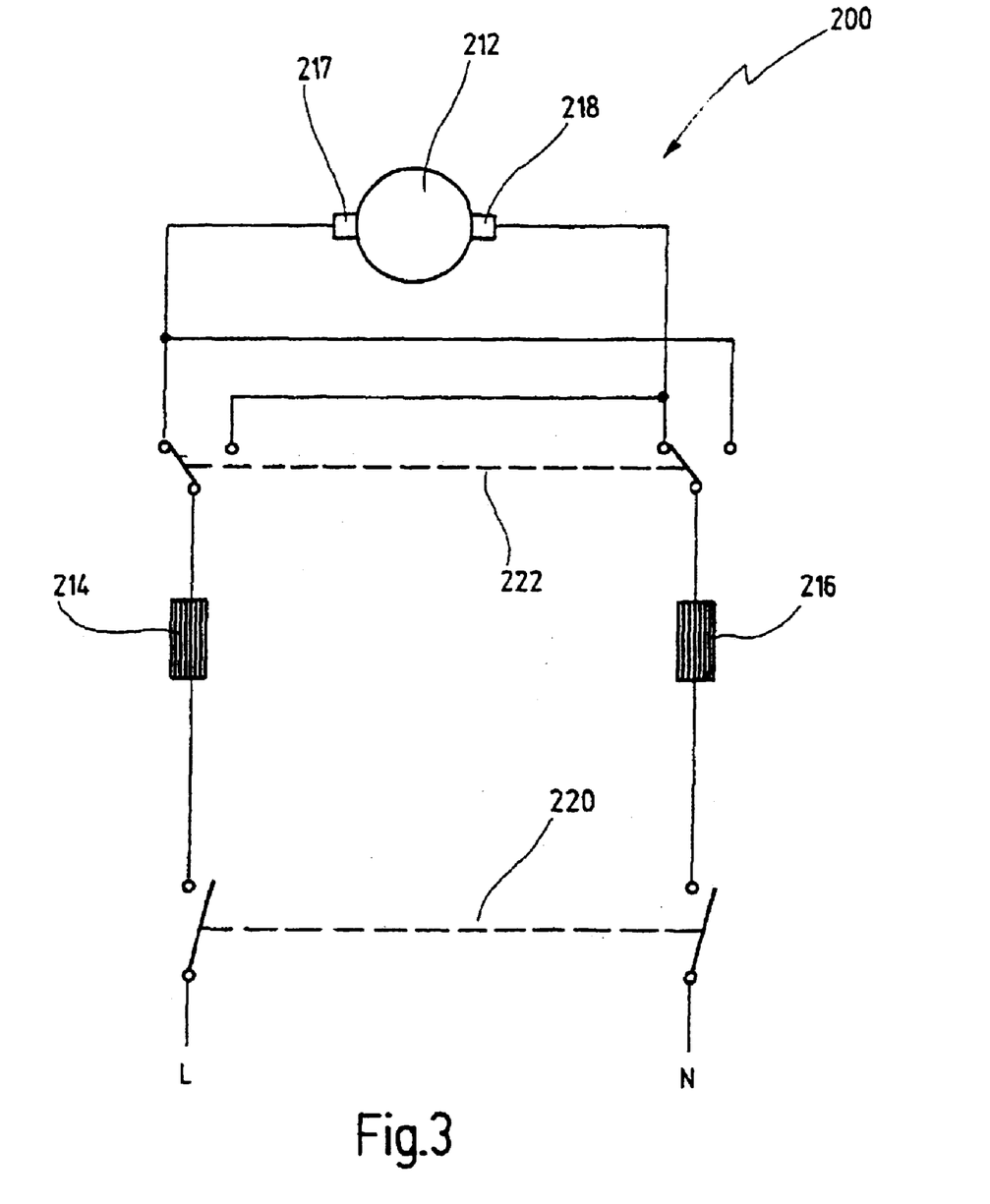
FIG. 3 shows a simplified circuit diagram of a motor comprising the stator of FIG. 1, the direction of rotation of which can be reversed.

A series-wound motor that may comprise the stator 280 according to FIG. 1 and that allows two opposite directions of rotation will be briefly explained with reference to FIG. 3 showing a circuit diagram of motor 200. The armature having an armature coil 212 is connected in series via brushes 217, 218 and a switch 222 with the two field coils 214, 216 (which may also be regarded as one field coil subdivided into two coil parts) and via an on/off-switch 220 to two poles of a voltage source which are denoted with N and L. Switch 222 is configured as a two-way switch allowing a reversal of the current flow path through the armature winding 212. Thereby the direction of rotation of the armature can be reversed.

Figure 4:
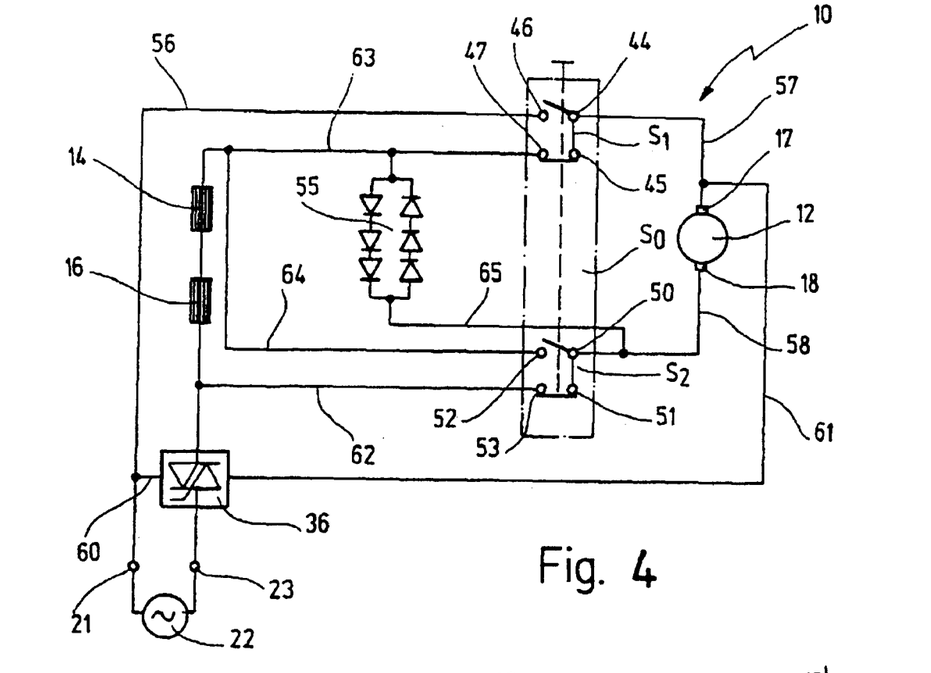
FIG. 4 shows a simplified circuit diagram of a retarded motor in brake operation according to the present invention.

An alternative embodiment of a series-wound motor according to the invention having a preferred direction of rotation and a braking system is shown in FIG. 4 and indicated with numeral 10. The motor 10 includes an armature with an armature coil 12, which is connected in motor operation in series with a voltage source 22 through a commutator (not shown) and schematically indicated brushes 17, 18 via switching means $S_0$. The voltage source 22 supplies alternating current.

The switching means $S_0$ has two poles including a first switch $S_1$ and a second switch $S_2$. The first pole of the voltage source 22 is connected with a line 56 to a first contact 46 of the first switch $S_1$ which connects to the contact 44 when the switch $S_1$ is closed. The contact 44 in turn is coupled to a brush 17 through a line 57. The second brush 18 is connected with a line 58 to contacts 50, 52 of the second switch $S_2$, the contacts being connected to one another in motor operation. The contact 52 is connected through a line 64 to the first field coil 14. The two field coils 14, 16 are connected in series. The end of the second field coil 16 is connected through an electronic control 36 to the second pole 23 of the voltage source 22. The electronic control 36 is additionally connected by the control line 60 to the first pole 21 of the voltage source 22 and in addition is coupled through a control line 61 to the contacts 44, 45 of the first switch $S_1$.

The electronic control 36 restricts the start-up current when turning on the motor, limits the idle speed of the motor and prevents the motor from starting when a plug for connecting the voltage source 22 is plugged in at a time when the switching means $S_0$ is in the ON position. This electronic control 36, known per se, is connected to the second field coil 16, while the other field coil 14, as mentioned, is coupled to the brush 18 through the switching means $S_0$ in motor operation via the line 64 and the contacts 50, 52 of the second switch $S_2$. The suppression of interference in the series-wound motor 10 is simplified with this arrangement.

In the brake operation illustrated in FIG. 4, the contacts 44, 46 of the first switch $S_1$ are open, while the further contacts 45, 47 of the first switch $S_1$ are closed. At the same time, in brake operation, the contacts 50, 52 of the second switch $S_2$ are open, while the contacts 51, 53 of the second switch $S_2$ are closed.

An anti-parallel diode array 55 is arranged between the contact 50 of the second switch $S_2$, connected to the brush 18, and the end of the first field coil 14. The diode array is connected through a line 65 to the contact 50 and through a line 63 to the contact 47 of the first switch $S_1$ and to the end of the first field coil 14.

Thus in brake operation, a closed brake circuit results over the two field coils 14, 16, the line 62, the contacts 53, 51, 50 of the switch $S_2$, the line 58 over the brushes 17, 18, the commutator and the armature coil 12 and the line 57 to the contacts 44, 45, 47 of the first switch $S_1$ and the line 63 back to the field coil 14. In addition, the anti-parallel diode array 55 in brake operation is connected in parallel to the field coils 14, 16 and to the armature coil 12.

Figure 5:
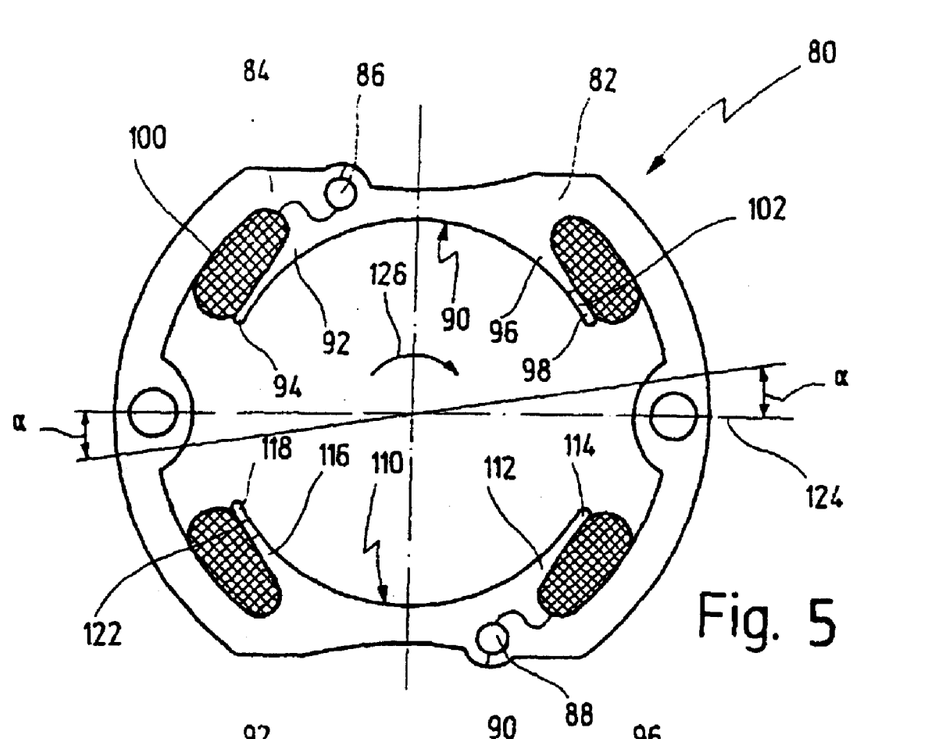
FIG. 5 shows a front view of the stator of the motor in FIG. 4.

FIG. 5 shows the configuration of a stator 80 according to the present invention. The stator 80 is preferably formed of two halves 82, 84 as is disclosed in detail in the German patent application DE 195 07 264. The construction simplifies the assembly of the field winding packages onto the stator 80. After mounting the winding packages 100, the two halves 82, 84 are secured to one another by inserting the pins 86, 88 in the corresponding openings, so that the stator 80 forms a magnetically closed yoke.

The stator 80 has a first field pole 90 and a second field pole 110 lying opposite to one another. Each of the field poles 90, 110 comprises two pole horns 92, 96 and 112, 116. The preferred rotary direction of the motor is indicated with the arrow 126. Thus the first field pole 90 has a pole horn 92 with a run-on edge 94 and a pole horn 96 with a run-off edge 98. Similarly, the second field pole 110 has a pole horn 112 with a run-on edge 114 and a pole horn 116 with a run-off edge 118.

Figure 6:
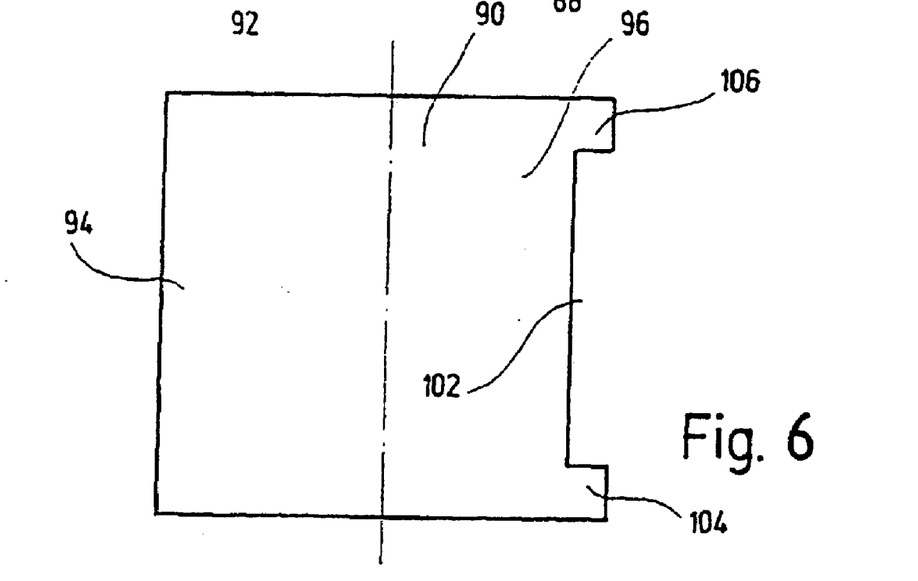
FIG. 6 shows a projection of the field pole shown in FIG. 5 onto a flat plane, seen from the inside.

The two pole horns 96, 116 with run-off edges 98, 118 each comprise a recess or cutout section 102, 122 when viewed in circumferential direction, as can be seen in detail in FIG. 6. FIG. 6 shows a view of the first field pole 90 from the inside, wherein the view is projected onto a flat plane.

The pole horn 92 on the side of the run-on edge 94 is made in conventional manner from a plurality of layers of sheet metal packetized to a solid block, i.e. without recesses. On the other hand, the pole horn 96 on the side of the run-off edge 98 comprises a recess or cutout section 102 extending in axial direction of the stator 80, which is enclosed at both axial ends of the pole horn 96 through projections or tongues 104, 106 substantially extending in circumferential direction.

The pole horns 92, 96 are generally symmetrical to one another, where the pole horn 96 is only shortened at the run-off edge 98 by the recess 102, while the extension of the tongues 104, 106 corresponds to the dimensions of the other pole horn 92. A corresponding recess is provided on the other pole horn 116 of the second field pole 110, which is only indicated in FIG. 5 with the numeral 122.

FIG. 5 also shows the geometric neutral zone indicated by the line 124. The brushes 17, 18 of the motor 10 are arranged to be shifted contrary to the rotary direction 126 by an angle α, as generally known in such universal motors to improve the commutation in motor operation and to avoid sparking.

The commutation in brake operation is considerably improved by the recesses 102, 122 on the run-off sides of the pole horns 96, 116, without the necessity of commutating windings or additional coils. At the same time, practically no disadvantages arise for the motor operation.

It will be understood that the tongues 104, 106 and the recess 102 of FIG. 6 only represent an example. Additional or differently formed tongues can also be provided. The form and arrangement of the recess or recesses at the run-off sides of the pole horns can also be varied. Also on the run-on side corresponding projections or tongues as shown in FIG. 1 could be provided.

A distinctly improved self-excitation in brake operation is ensured with the given configuration of the pole horns 96, 116 at the run-off edges 98, 118, so that in the simplest case the circuit of FIG. 4 is sufficient to guarantee a reliable initiation of braking when switching to brake operation.

Figure 7:
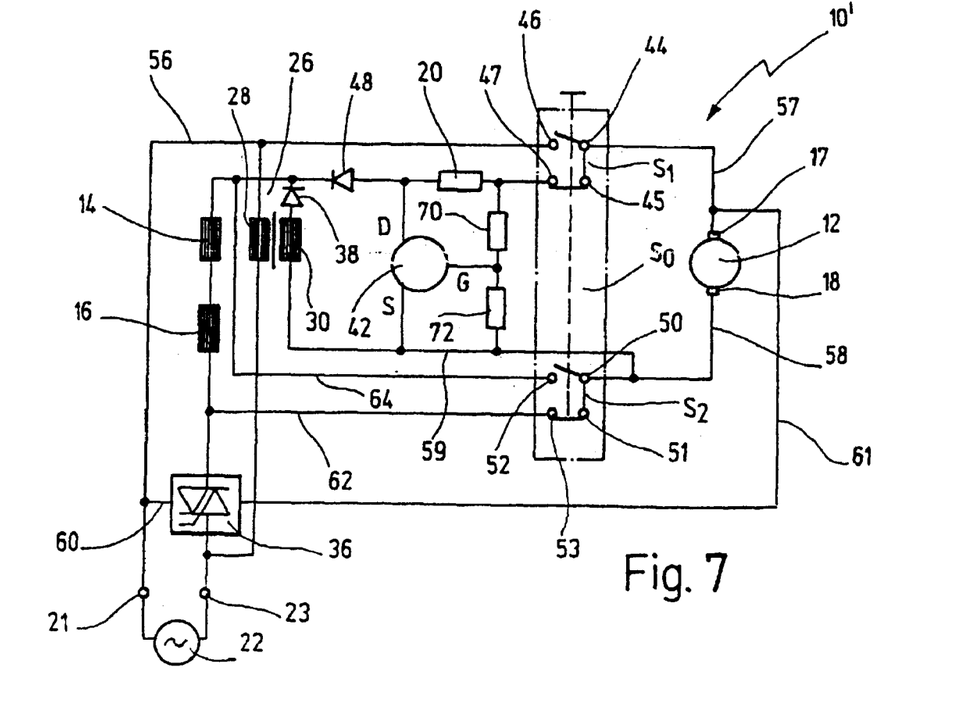
FIG. 7 shows a modified circuit diagram of a motor in brake operation mode according to the present invention.

An even greater reliability in initiating braking and also a particularly advantageous braking characteristic, i.e. the braking behavior over time, can be achieved with the modified circuit shown in FIG. 7. FIG. 7 shows a series-wound motor indicated generally with the numeral 10'. Parts corresponding to those given in FIG. 4 are indicated with the same reference numerals.

The basic configuration of the circuit corresponds to the embodiment of FIG. 4, where however the anti-parallel diode array 55 is removed and instead a transformer 26 is provided together with a field effect transistor circuit.

The transformer 26 is connected at its primary side 28 directly to the two poles 21, 23 of the voltage source 22. At its secondary side 30, the transformer 26 is connected through a diode 38 to the one end of the first part 14 of the field coil and at its other end is connected through a line 59 to the contact 50 of the second switch $S_2$ as well as through the line 58 to the brush 18 of the armature coil 12. As seen in FIG. 7, the brush 18 in brake operation is connected to the end of the second field coil 16 through the line 58 and the contacts 50, 51, 53 of the second switch $S_2$ and the line 62.

A field effect transistor 42 of the type IRF 540 is coupled with the drain D through a diode 48 to the end of the first field coil 14, and therefore it is also coupled to the diode 38. Both diodes 38, 48 are thus connected with their cathodes to the end of the first field coil 14. The field effect transistor 42 is connected with its source S through the line 59 to the contact 50 of the second switch $S_2$ and therefore through the line 58 to the brush 18 of the armature coil 12. The anode of the diode 48 is connected through a load resistor 20 to the contact 47 of the first switch $S_1$, which in the indicated brake operation position is connected through the contacts 45, 44 with the line 57 to the brush 17.

The field effect transistor 42 is connected with its gate G through a voltage divider 70, 72 between the contact 47 of the first switch $S_1$ and the line 59, which connects to the contact 50 of the second switch $S_2$. The voltage divider comprises a first resistor 70, having for example 1 kOhm and a second resistor 72 having a rating of 6 kOhm. The resistor 70 is connected at one end to the contact 47 of the switch $S_1$ and with its other end to the resistor 72, which in turn is connected to the contact 50 of the switch $S_2$. The gate G of the field effect transistor is connected between the resistors 70, 72. A Zener-diode could also be provided instead of the resistor 70, which generates the desired switching voltage.

The field effect transistor 42 is triggered at its gate G by the voltage divider 70, 72, where the voltage is taken off at the interconnection of the resistors 70, 72. The field current is regulated in brake operation in the motor of FIG. 4 by the field effect transistor 42 and the armature voltage is held nearly constant during the brake operation until it finally falls off at the end of the braking process.

The dimensioning for a motor having a power rating of about 2000 W at 230 V alternating current is designed such that the transformer has a secondary voltage of 4 V at a power level of 0.25 W. A field effect transistor 42 of the type MOSFET IRF 540 can be used, which is designed for a maximum current of 28 A and a maximum stray power of 125 W. A load resistor 20 can be used with a resistance of 0.33 Ohm at a stray power of 10 W. As mentioned, the voltage divider can consist of the resistor 70 having 1 kOhm and the resistor 72 having 6 kOhm.

The field effect transistor 42 becomes conductive during the brake operation when a voltage of about 4 V is applied by the voltage divider 70, 72 between the gate G and the source S. Voltage is applied to the load resistor 20 which depends on the amount of current flowing through the armature coil 12, so that in this embodiment the armature voltage remains nearly constant during the brake operation and the field current is regulated by the field effect transistor 42.

At the end of the brake operation, the armature voltage falls off strongly, so that the field effect transistor 42 goes over to the non-conductive state. The field current flowing through the field coils 14, 16 rises again for a short time, so that the braking effect at the end is enhanced.

The above embodiment is particularly advantageous for a angle grinder with a high power rating of about 2000 W because it shows a particularly favorable braking characteristic.

Figure 8:
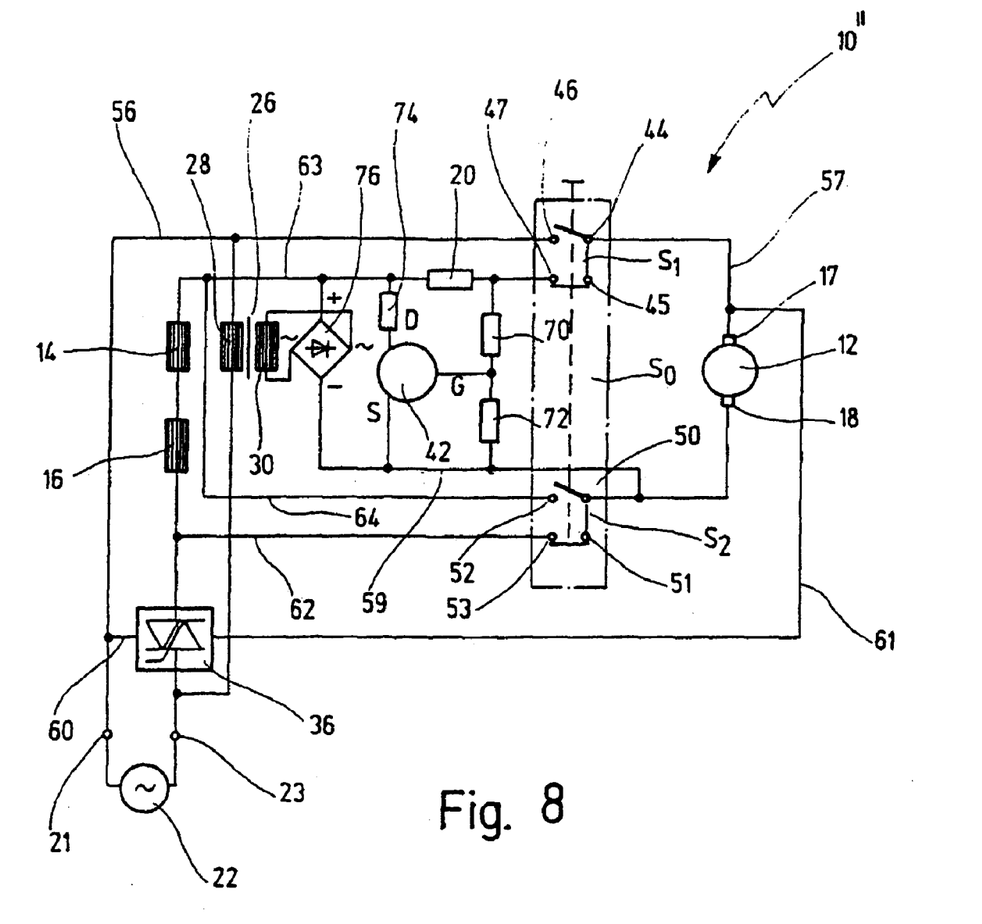
FIG. 8 shows another modified circuit diagram of a retarded motor in brake operation mode according to a different embodiment of the present invention.

In FIG. 8 a further circuit configuration of a series-wound motor according to the current invention is indicated generally with the numeral 10". Parts corresponding to those given in FIG. 7 are indicated with the same reference numerals.

The basic configuration of the circuit corresponds to the embodiment of FIG. 7, wherein merely the diodes 38 and 48 were deleted. Instead, the secondary winding 30 of the transformer 26 feeds the input ends of a bridge rectifier 76, the output ends of which are connected at the positive pole to line 63 which is connected with field coil 14, while the negative pole of the output end of the bridge rectifier 76 is connected with source S of the field effect transistor 42. Resistor 20 is now directly coupled to field coil 14 and the positive pole of bridge rectifier 76. Differing from the circuit according to FIG. 7, drain D of the field transistor 42 is coupled to resistor 20 and to field coil 14 via a resistor 74 which may be selected to be 0.15 Ohm, while the remaining portions of the circuit can be equally designed as previously explained with respect to FIG. 7.

Since according to this embodiment diode 48 in the brake circuit was deleted, also the problem inherent thereto is avoided. Namely, in the embodiment according FIG. 7, when the voltage drops to the threshold value of the diode, which is roughly 0.7 to 0.8 V, the current flow stops. In the embodiment according to FIG. 8, now the braking or retardation continues until the braking operation is fully completed. Also it is avoided that during the time in which diode 48 according to FIG. 7 is in the blocking state, a self-excitation occurs in a direction contrary to braking, which otherwise might occur under unfavorable conditions.

For a reliable operation of the circuit according to FIG. 8, the switch $S_0$ should be designed such, that when switching from the motor operation mode into the braking mode after opening contacts 44, 46 and 50, 52, respectively, in the beginning the connection between contacts 51 and 53 is closed, before the connection between contacts 45 and 47 is closed.

The bridge rectifier 76 in connection with such a switch $S_0$ thus clearly predefines the direction of self-excitation under all conditions in the braking mode.

What is claimed is:

1. A series-wound motor comprising:

an armature including a commutating armature coil;

a stator forming a closed yoke within which said armature is mounted rotatably, said stator having first and second axial ends;

brushes connectable to a voltage source for sliding contact with said armature coil;

at least two field poles provided on said stator, each said field pole comprising a center section being integral with said closed yoke and further comprising two pole horns extending circumferentially from said center section and defining first and second axial grooves extending between said closed yoke and said pole horns;

at least two field coils attached to said stator, each said field coil having two axial ends and two lateral parts extending between said axial ends, each said field coil being received with its lateral parts within said axial grooves and protruding with its axial ends beyond said first and second axial ends of said stator;

wherein at least one of said pole horns comprises at least a first protrusion protruding circumferentially from an axial edge of said pole horn and a second protrusion protruding circumferentially from said axial edge of said pole horn;

wherein each one of said pole horns comprises at least a first protrusion protruding circumferentially from an axial edge of said pole horn and a second protrusion protruding circumferentially from said axial edge of said pole horn;

wherein each said field coil is configured as a preformed winding, and wherein said lateral parts of said field coils are retained within said axial grooves of said stator by said first and second protrusions; and wherein said first and second protrusions are arranged at said first and second axial ends of said stator.

2. A series-wound motor comprising:

an armature including a commutating armature coil;

a stator forming a closed yoke within which said armature is mounted rotatably, said stator having first and second axial ends;

brushes connectable to a voltage source for sliding contact with said armature coil;

at least two field poles provided on said stator, each said field pole comprising a center section being integral with said closed yoke and further comprising two pole horns extending circumferentially from said center section and defining first and second axial grooves extending between said closed yoke and said pole horns;

at least two field coils attached to said stator, each said field coil having two axial ends and two lateral parts extending between said axial ends, each said field coil being received with its lateral parts within said axial grooves and protruding with its axial ends beyond said first and second axial ends of said stator;

wherein at least one of said pole horns comprises at least a first protrusion protruding circumferentially from an axial edge of said pole horn and a second protrusion protruding circumferentially from said axial edge of said pole horn; and wherein said first and second protrusions are arranged at said first and second axial ends of said stator.

3. The series-wound motor of claim 2, wherein each one of said pole horns comprises at least a first protrusion protruding circumferentially from an axial edge of said pole horn and a second protrusion protruding circumferentially from said axial edge of said pole horn.

4. The series-wound motor of claim 2, wherein each said field coil is configured as a preformed winding, and wherein said lateral parts of said field coils are retained within said axial grooves of said stator by said first and second protrusions.

5. The series-wound motor of claim 2, wherein each said pole horn comprises at least a third protrusion protruding circumferentially from said axial edge of said pole horn.

6. The series-wound motor of claim 2, further comprising switching means for switching between a first rotating direction of said armature and between a second rotating direction of said armature.

7. A series-wound motor having a preferred rotary direction, said motor comprising:
- an armature including a commutating armature coil;
- a stator forming a closed yoke within which said armature is mounted rotatably, said stator having first and second axial ends;
- brushes connectable to a voltage source for sliding contact with said armature coil;
- at least two field poles provided on said stator, each said field pole comprising a center section being integral with said closed yoke and further comprising two pole horns extending circumferentially from said center section and defining first and second axial grooves extending between said closed yoke and said pole horns, one of said pole horns extending from said center section contrary to said preferred rotary direction and ending in a run-on edge, another one of said pole horns extending from said center section in said preferred rotary direction and ending in a run-off edge;
- at least two field coils connected in series;
- switching means for switching said motor between a motor operation mode and a braking mode, wherein, when being in said motor operation mode, said field coils are connected in series with said armature coil, in a motor circuit fed by said voltage source, and wherein, when being in said braking mode, said field coils form a closed brake circuit with said armature coil being separated from said voltage source;
- wherein said run-off edges of said pole horns each comprise at least first and second protrusions extending circumferentially from said run-off edge.

8. The motor of claim 7, wherein said first and second protrusions are configured as tongues extending circumferentially and defining cutout sections therebetween.

9. The motor of claim 8, wherein each said run-off edge at said cutout section has a smaller distance in circumferential direction from a center of said center section than has said run-on edge from said center.

10. The series-wound motor of claim 7, wherein each said field coil is configured as a preformed winding comprising two axial ends and two lateral parts extending therebetween, and wherein said lateral parts of said field coils are retained within said axial grooves of said stator by said first and second protrusions.

11. The series-wound motor of claim 7, wherein said first and second protrusions are arranged at said first and second axial ends of said stator.

12. The series-wound motor of claim 7, wherein each said pole horn comprises at least a third protrusion protruding circumferentially from said axial edge of said pole horn.

13. The series-wound motor of claim 7, wherein said stator comprises a geometric neutral zone, said commutating armature coil being displaced with respect to said geometric neutral zone counter to the preferred rotary direction.

14. The motor of claim 7, wherein said run-on edges of said pole horns each comprise at least two protrusions extending circumferentially from said run-on edge.

15. The motor of claim 7, further comprising means for restricting the current flowing in the brake mode within said brake circuit.

16. The motor of claim 15, further comprising a transformer having a primary winding and a secondary winding, said primary winding being fed by an alternating voltage source also feeding the motor when being in operating mode, said secondary winding being connected in parallel with the field coils in the brake circuit, when being in braking mode, and further comprising an electronic control switch for controlling the current flowing in the brake circuit across the armature coil and the field coil.

17. The motor of claim 16, wherein the control switch is a field effect transistor having a source, a drain and a gate, said field effect transistor being coupled in parallel with its source and its drain to the series-connected field coils via a diode and regulating the current through the field coils depending on the current flowing across the armature coil.

18. The motor of claim 17, wherein the field effect transistor in the brake circuit is connected with its gate to the brushes via a voltage divider.

19. The motor of claim 18, further comprising a load resistor being connected in the brake circuit between one of said brushes and one end of the series-connected field coils via a diode, wherein the drain of the field effect transistor is connected to one end of the load resistor, and wherein the source of the field effect transistor is connected to another one of said brushes and another end of the series-connected field coils.

20. The motor of claim 16, wherein the secondary winding is connected in parallel with the series-connected field coils in the brake circuit via a rectifier.

21. The motor of claim 15, further comprising a transformer having a primary winding and a secondary winding, said primary winding being fed by an alternating voltage source also feeding the motor when being in operating mode, said secondary winding being connected via a rectifier circuit in parallel with the series-connected field coils in the brake circuit, when being in braking mode, and further comprising an electronic control switch for controlling the current flowing in the brake circuit across the armature coil and the series-connected field coils.

22. The motor of claim 21, wherein the control switch is a field effect transistor having a source, a drain and a gate, said field effect transistor being coupled in parallel with its source and its drain to the series-connected field coils and regulating the current through the series-connected field coils depending on the current flowing across the armature coil.

23. The motor of claim 22, further comprising a bridge rectifier, said bridge rectifier having A.C. input ends being coupled to the secondary winding and having D.C. output ends being connected in parallel with the field coils in the brake circuit, wherein a positive voltage output end of said bridge rectifier is coupled to the drain of said field effect transistor, and wherein a negative voltage output end of said bridge rectifier is coupled to the source of said field effect transistor.

24. The motor of claim 22, wherein the field effect transistor in the brake circuit is connected with its gate to the brushes via a voltage divider.

25. A series-wound motor having a preferred rotary direction, said motor comprising:
- an armature including a commutating armature coil;
- a stator within which said armature is mounted rotatably;
- brushes connectable to a voltage source for sliding contact with said armature coil;
- at least two field poles provided on said stator, each said field pole comprising a center section being integral with said closed yoke and further comprising two pole horns extending circumferentially from said center section and defining first and second axial grooves extending between said closed yoke and said pole horns, one of said pole horns extending from said center section contrary to said preferred rotary direction and ending in a run-on edge, another one of said pole horns extending from said center section in said preferred rotary direction and ending in a run-off edge;

at least two field coils connected in series;

switching means for switching said motor between a motor operation mode and a braking mode, wherein, when being in said motor operation mode, said field coils are connected in series with said armature coil in a motor circuit fed by said voltage source, and wherein, when being in said braking mode, said field coils form a closed brake circuit with said armature coil being separated from said voltage source;

wherein said run-off edges of said pole horns each have a smaller distance in circumferential direction from said center line than have said run-on edges from said center line.

26. The motor of claim 25, wherein said run-off edges of said pole horns each comprise at least two protrusions extending in circumferential direction, between which a cutout section is formed.

27. The motor of claim 25, wherein the stator comprises a geometric neutral zone, said commutating armature coil being displaced with respect to said geometric neutral zone counter to the preferred rotary direction.

28. The motor of claim 25, further comprising means for restricting the current flowing in the brake mode within said brake circuit.

29. The motor of claim 28, further comprising a transformer having a primary winding and a secondary winding, said primary winding being fed by an alternating voltage source also feeding the motor when being in operating mode, said secondary winding being connected in parallel with said series-connected field coils in the brake circuit, when being in braking mode, and further comprising an electronic control switch for controlling the current flowing in the brake circuit across the armature coil and the field coils.

30. The motor of claim 29, wherein the control switch is a field effect transistor having a source, a drain and a gate, said field effect transistor being coupled in parallel with its source and its drain to the series-connected field coils via a diode and regulating the current through the series-connected field coils depending on the current flowing across the armature coil.

31. The motor of claim 30, wherein the field effect transistor in the brake circuit is connected with its gate to the brushes via a voltage divider.

32. The motor of claim 31, further comprising a load resistor being connected in the brake circuit between one of said brushes and one end of the series-connected field coils via a diode, wherein the drain of the field effect transistor is connected to one end of the load resistor, and wherein the source of the field effect transistor is connected to another one of said brush and another end of the series-connected field coils.

33. The motor of claim 29, wherein the secondary winding is connected in parallel with the series-connected field coils in the brake circuit via a rectifier.

* * * * *